(12) United States Patent
Sugiyama et al.

(10) Patent No.: US 8,320,073 B2
(45) Date of Patent: Nov. 27, 2012

(54) PERPENDICULAR MAGNETIC RECORDING HEAD AND METHOD FOR PRODUCING THE SAME

(75) Inventors: Mikito Sugiyama, Odawara (JP); Kazuhiro Nakamoto, San Jose, CA (US); Kaori Suzuki, Fijisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 113 days.

(21) Appl. No.: 12/911,413

(22) Filed: Oct. 25, 2010

(65) Prior Publication Data

US 2011/0102936 A1    May 5, 2011

(30) Foreign Application Priority Data

Oct. 30, 2009    (JP) ................................ 2009-250053

(51) Int. Cl.
*G11B 5/31*    (2006.01)
(52) U.S. Cl. ...................................................... 360/110
(58) Field of Classification Search .................... 360/110
See application file for complete search history.

(56) References Cited

U.S. PATENT DOCUMENTS

| | | | | |
|---|---|---|---|---|
| 6,950,277 B1 * | 9/2005 | Nguy et al. | ............ | 360/125.14 |
| 7,075,756 B1 * | 7/2006 | Mallary et al. | ............ | 360/317 |
| 7,133,252 B2 * | 11/2006 | Takano et al. | ............ | 360/125.13 |
| 7,159,302 B2 * | 1/2007 | Feldbaum et al. | ............ | 29/603.12 |
| 7,212,379 B2 * | 5/2007 | Hsu et al. | ............ | 360/125.16 |
| 7,436,628 B2 | 10/2008 | Kameda et al. | | |
| 7,443,633 B2 | 10/2008 | Tagami et al. | | |
| 7,646,564 B2 * | 1/2010 | Maruyama et al. | ......... | 360/125.07 |
| 7,791,839 B2 * | 9/2010 | Olson et al. | ............ | 360/125.31 |
| 7,793,406 B2 * | 9/2010 | Zheng | ............ | 29/603.16 |

FOREIGN PATENT DOCUMENTS

| | | |
|---|---|---|
| JP | 2002/133610 A | 10/2002 |
| JP | 2004/118246 B2 | 4/2004 |
| JP | 2006/196142 A | 7/2006 |
| JP | 2006/252620 A | 9/2006 |
| JP | 04118246 B2 | 7/2008 |

* cited by examiner

*Primary Examiner* — Mark Blouin
(74) *Attorney, Agent, or Firm* — Zilka-Kotab, PC

(57) ABSTRACT

According to one embodiment, a perpendicular magnetic recording head includes a main pole, wherein a thickness in a down-track direction of the main pole increases moving away from an air bearing surface of the magnetic pole, and wherein a center position in a thickness direction of a portion of the main pole which is exposed at the air bearing surface (the ABS portion) is positioned toward a trailing side of the main pole with respect to a center position in a thickness direction of a portion of the magnetic pole having a greatest cross-sectional area and which is set back from the air bearing surface (the set-back portion). Further embodiments of this magnetic recording head, along with systems thereof and methods of producing magnetic recording heads are also described, according to more embodiments.

23 Claims, 12 Drawing Sheets angle of inclination θ_L angle of inclination $\theta_T$

PERPENDICULAR MAGNETIC RECORDING HEAD AND METHOD FOR PRODUCING THE SAME

RELATED APPLICATIONS

The present application claims priority to a Japanese Patent Application filed Oct. 30, 2009, under Appl. No. 2009-250053, which is incorporated herein by reference.

FIELD OF THE INVENTION

The present invention relates to a perpendicular magnetic recording head for increasing the recording density of data stored to a magnetic medium and a method for producing the same.

BACKGROUND OF THE INVENTION

A high field strength which allows recording on a medium having high heat stability and a high field gradient for forming a steep boundary between bits is very beneficial to the field of data storage since it may be used to increase a recording density in perpendicular magnetic recording on magnetic media, which may be used with a hard disk drive (HDD). However, it is difficult to maintain or improve field strength while maintaining a high heat stability and a high field gradient as the size of the magnetic pole's air bearing surface, which provides for the increased track density, becomes smaller. This is because the saturation magnetic flux density of the pole which most strongly affects the recording field characteristics, and the distance between the magnetic head and the recording medium, are generally close to the physical and technical limits of conventional technologies, and scaling these dimensions down in proportion to the pole size leads to breakdown or failure. This currently is a fundamental issue in magnetic recording systems.

In addition, the abovementioned limits also affect the shape of the magnetization pattern formed on the recording medium. The shape of the recording bits generally reflects the head field distribution. That is to say, a magnetization pattern which has a scaling relationship with the pole shape is formed on the recording medium by the magnetic flux which is isotropically dissipated from the pole. This means that if the head dimensions and the distance between the magnetic head and the medium are all proportionately compressed under fixed conditions of saturation magnetic flux density, the shape of the magnetization pattern will also be proportionately compressed. However, in the present situation where the reduction in the distance between the magnetic head and the medium is insufficient, the pole shape and field distribution deviate from the scaling relationship, and the magnetization pattern is distorted, which is undesirable.

The most striking effect due to this phenomenon is the curvature of the recording transition line. As shown in FIG. 1, which is a schematic of a magnetization pattern formed on a medium according to the prior art, the problem of the curvature of the recording transition line has already been identified, and it is an issue that needs resolving in order to increase track density. Japanese Patent No. 4118246, for example, discloses technology for resolving this issue, in which the end of the pole is made to curve in the opposite direction to the magnetization pattern. Also, Japanese Unexamined Patent Appl. Pub. No. 2006-196142 proposes forming a pole from a material such that the saturation magnetic flux density decreases toward the center from the peripheral edge of the pole.

However, both of the solutions presented above according to the prior art has an intrinsic problem in that the magnetic field strength is reduced, and a reduction in the curvature of the transition line makes it difficult to obtain suitable recording characteristics, such as field gradient and saturation recording performance.

Therefore, a solution that can provide a high magnetic field strength which allows for recording on a magnetic medium having high heat stability and a high field gradient for forming a steep boundary between bits would be very beneficial to the field of data storage.

SUMMARY OF THE INVENTION

According to one embodiment, a perpendicular magnetic recording head includes a main pole, wherein a thickness in a down-track direction of the main pole increases moving away from an air bearing surface of the magnetic pole, and wherein a center position in a thickness direction of a portion of the main pole which is exposed at the air bearing surface (the ABS portion) is positioned toward a trailing side of the main pole with respect to a center position in a thickness direction of a portion of the magnetic pole having a greatest cross-sectional area and which is set back from the air bearing surface (the set-back portion).

In another embodiment, a system includes a magnetic recording medium, at least one magnetic recording head as described above for reading from and/or writing to the magnetic recording medium, a magnetic head slider for supporting the at least one magnetic recording head, and a control unit coupled to the at least one magnetic recording head for controlling operation of the at least one magnetic recording head.

According to another embodiment, a method for producing a perpendicular magnetic recording head includes forming a mask on an inorganic insulating film formed on a wafer, etching the inorganic insulating film using the mask to form an inclined surface, wherein an angle of the inclined surface is controlled by the etching angle and the mask thickness so that an etching depth is at least half of an overall film thickness, removing the mask, forming a main pole magnetic film comprising a main pole by sputtering, forming a photomask in a shape of the main pole on the main pole magnetic film, etching the main pole magnetic film to form the main pole, planarizing the main pole magnetic film, forming a tapered portion of the main pole on a trailing side of the main pole using a mask which is formed at a position set back from an air bearing surface of the main pole, wherein an angle of the inclined surface is controlled by an etching angle and a thickness of the mask, and lapping to form the air bearing surface of the main pole.

Any of these embodiments may be implemented in a magnetic data storage system such as a hard disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to a general embodiment, a perpendicular magnetic recording head includes a main pole, wherein a thickness in a down-track direction of the main pole increases moving away from an air bearing surface of the magnetic pole, and wherein a center position in a thickness direction of a portion of the main pole which is exposed at the air bearing surface (the ABS portion) is positioned toward a trailing side of the main pole with respect to a center position in a thickness direction of a portion of the magnetic pole having a greatest cross-sectional area and which is set back from the air bearing surface (the set-back portion).

According to another general embodiment, a method for producing a perpendicular magnetic recording head includes forming a mask on an inorganic insulating film formed on a wafer, etching the inorganic insulating film using the mask to form an inclined surface, wherein an angle of the inclined surface is controlled by the etching angle and the mask thickness so that an etching depth is at least half of an overall film thickness, removing the mask, forming a main pole magnetic film comprising a main pole by sputtering, forming a photomask in a shape of the main pole on the main pole magnetic film, etching the main pole magnetic film to form the main pole, planarizing the main pole magnetic film, forming a tapered portion of the main pole on a trailing side of the main pole using a mask which is formed at a position set back from an air bearing surface of the main pole, wherein an angle of the inclined surface is controlled by an etching angle and a thickness of the mask, and lapping to form the air bearing surface of the main pole.

According to one embodiment, it is possible to improve the linearity of the head field distribution without any loss of the head field strength and the head field gradient, and it is possible to achieve high track density and high linear recording density.

Several exemplary embodiments are described below in specific terms with reference to the various figures.

Figure 1:
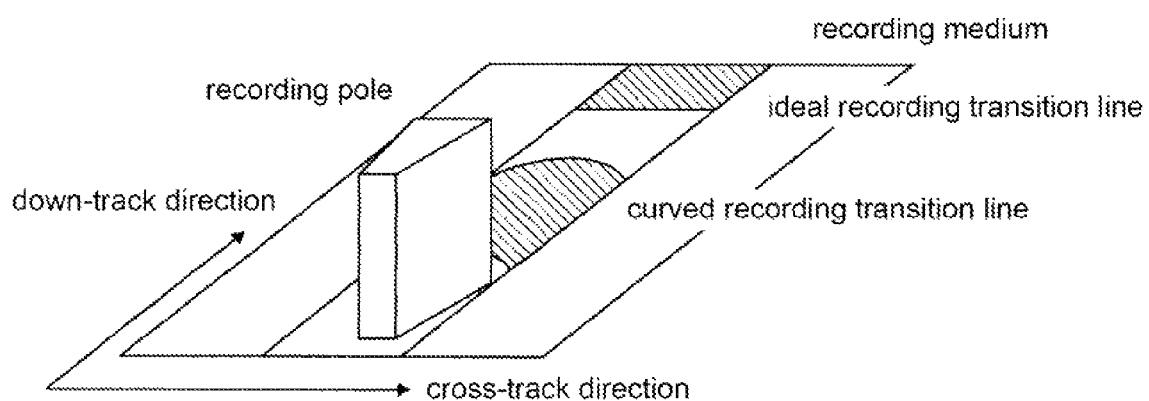
FIG. 1 is a schematic of the recording transition line in a perpendicular magnetic recording, according to the prior art.
Figure 2A:
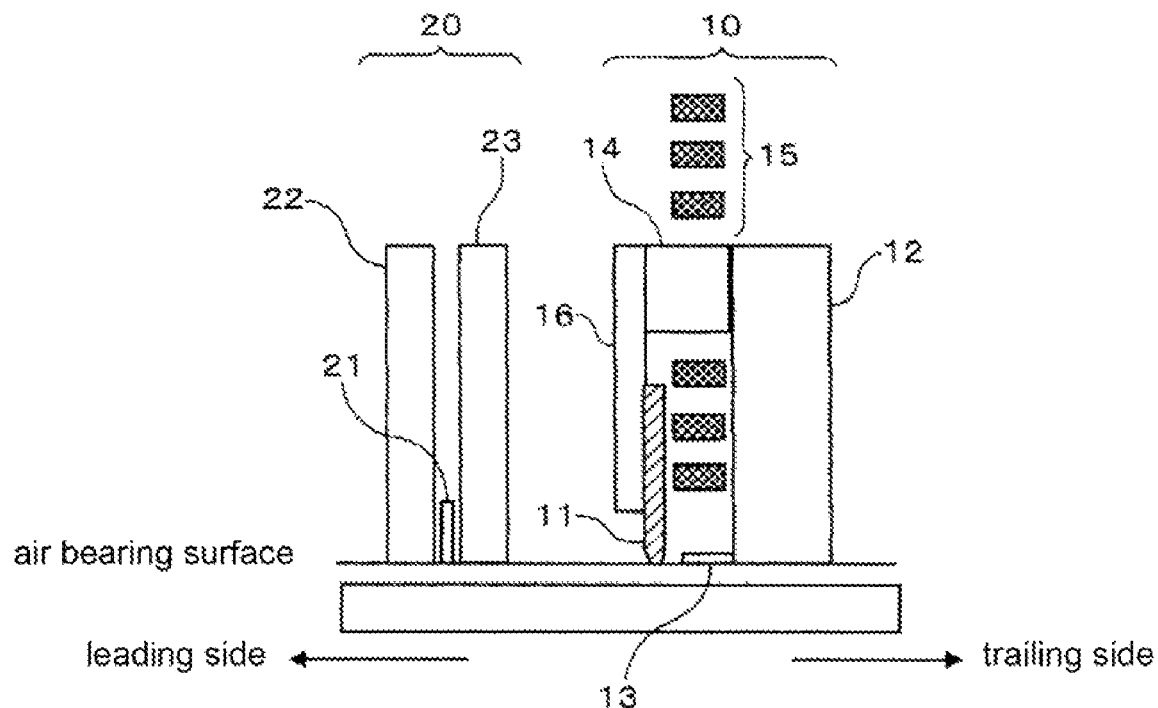
FIG. 2A is a cross-sectional view of a perpendicular magnetic recording head, according to one embodiment.

FIG. 2A is a cross-sectional view of a perpendicular magnetic recording head at the track center (referred to below simply as a "magnetic head"), according to one embodiment. This magnetic head comprises a recording head 10 provided with a main pole 11, and a playback head 20 provided with a playback element 21. A CIP-GMR element, TMR element, CPP-GMR element, etc., may be used in the playback head 20 with a pair of magnetic shields on either side, comprised of a leading side lower shield 22 a trailing side upper shield 23, in one approach.

The writing function part, according to one approach, may comprise the main pole 11 for writing to a magnetic disk, a shield 13 which is positioned at a prescribed distance from the main pole trailing side on the cross-track direction side surface, a sub-pole 12 which returns the magnetic flux from the magnetic disk, a back gap part 14 which magnetically connects the main pole and sub-pole, and a coil 15 which is surrounded by the main pole/sub-pole and the back gap part.

Figure 2B:
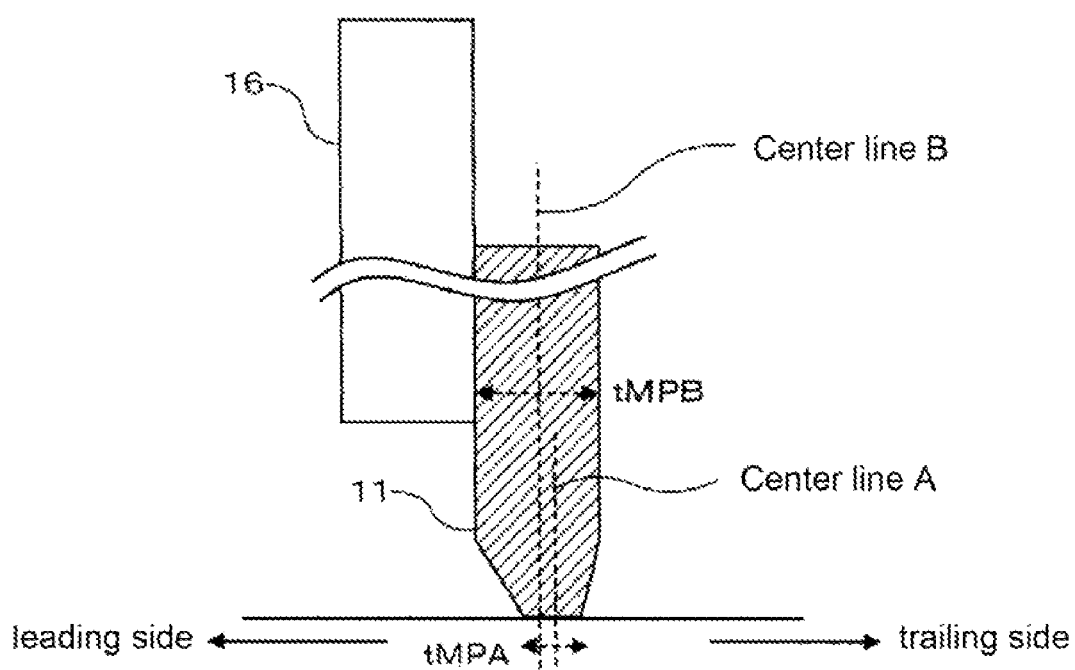
FIG. 2B is an enlarged schematic of the main pole portion of a magnetic head in accordance with an exemplary embodiment.

FIG. 2B is an enlarged schematic of the main pole 11 portion of the writing function part of the magnetic head shown in FIG. 2A, according to one embodiment. Here, the thickness (tMPA) of the portion of the main pole which is exposed at the air bearing surface (referred to below as the main pole air bearing surface portion) is less than the thickness (tMPB) of the portion of the main pole which is set back from the air bearing surface (referred to below as the main pole set-back portion). In this instance, the main pole set-back portion refers to a range whereby the presence of this portion affects the field strength at the air bearing surface (for example, a distance of about 200 nm, 300 nm, 400 nm, 500 nm, etc., in the air bearing height direction from the air bearing surface). In one approach, the center position (center line A) in the down-track direction of the main pole air bearing surface portion lies on the trailing side with respect to the center position (center line B) in the down-track direction, but is not so limited.

The features of the magnetic head, according to this exemplary embodiment, are described below. The shape of a magnetization pattern formed on a recording medium may be determined in accordance with the head field applied to the medium, in one approach. This means that the linearity of the recording pattern may be anticipated by evaluating the linearity of the field distribution shape, as found during testing of various designs.

The example described is based on the field distribution obtained by field calculations using the finite element method. The recording head used in the calculations has a length in the cross-track direction of the main pole (referred to below as the main pole width) of 60 nm, and a length in the down-track direction (main pole thickness) of 120 nm, and is constructed according to one embodiment.

Figure 3A:
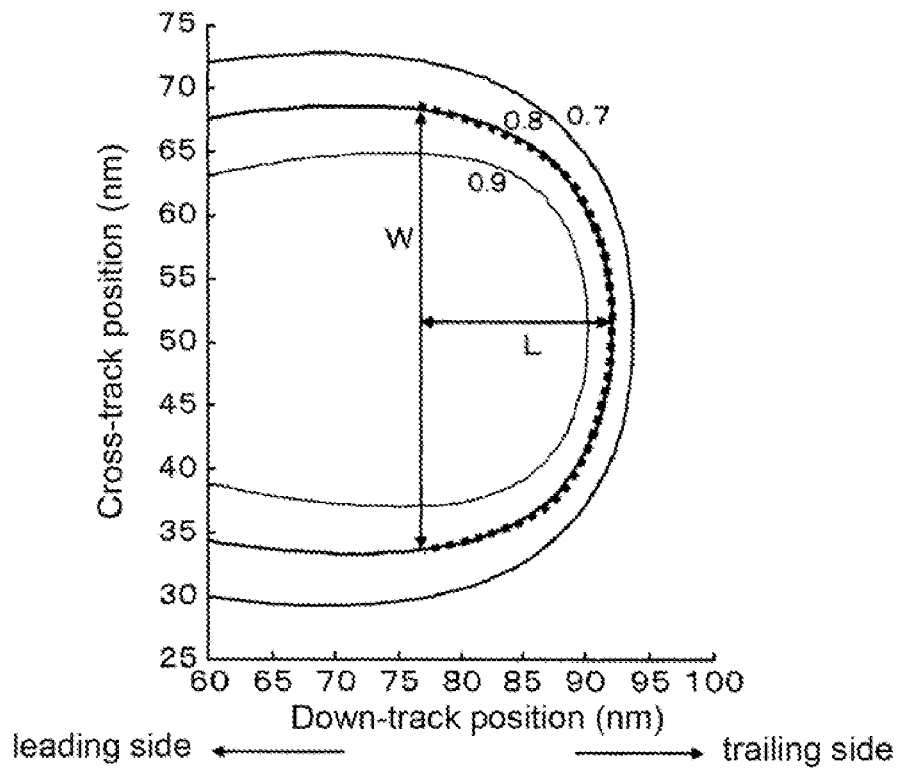
FIGS. 3A-3B show the head field distribution of a magnetic head in accordance with the prior art and an exemplary embodiment.
Figure 3B:
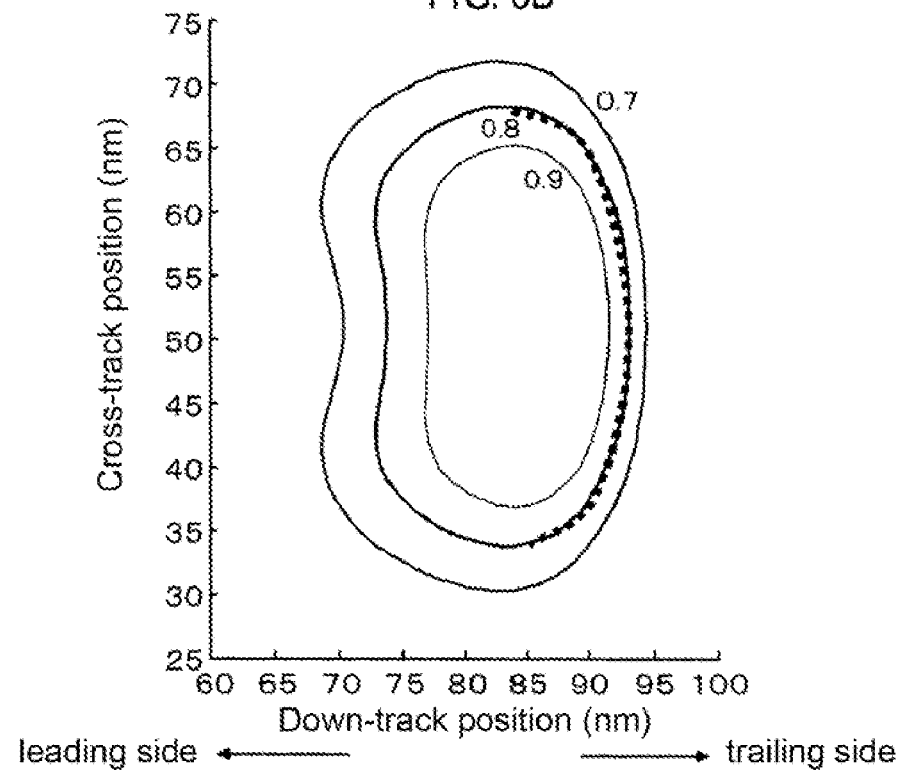

FIGS. 3A-3B show contour lines for the head field distribution obtained by field calculations (FIG. 3A is a conventional magnetic head, and FIG. 3B is a magnetic head according to one embodiment). The head field is shown standardized to the maximum magnetic field. As is clear from the figures, in a magnetic head constructed according to this exemplary embodiment, the magnetic field is concentrated at the trailing portion, and the center of gravity of the field strength lies more toward the trailing side than in the conventional structure. This happens, presumably, as a result of a reduction in the excess magnetic flux supplied to the leading side because the air bearing surface exposed portion lies on the trailing side. Here, a contour corresponding to a field strength of 80% of the maximum field strength is assumed to be the recording transition line, which serves as an indicator for evaluating the linearity of the field distribution, and the transition line curvature (C) is defined as C=L/W, using the maximum expansion width (W) in the track width direction of the curved line and the shift amount (L) in the down-track direction. The relationship between C and the position in the down-track direction of the main pole air bearing surface portion is shown in FIG. 4.

Figure 4:
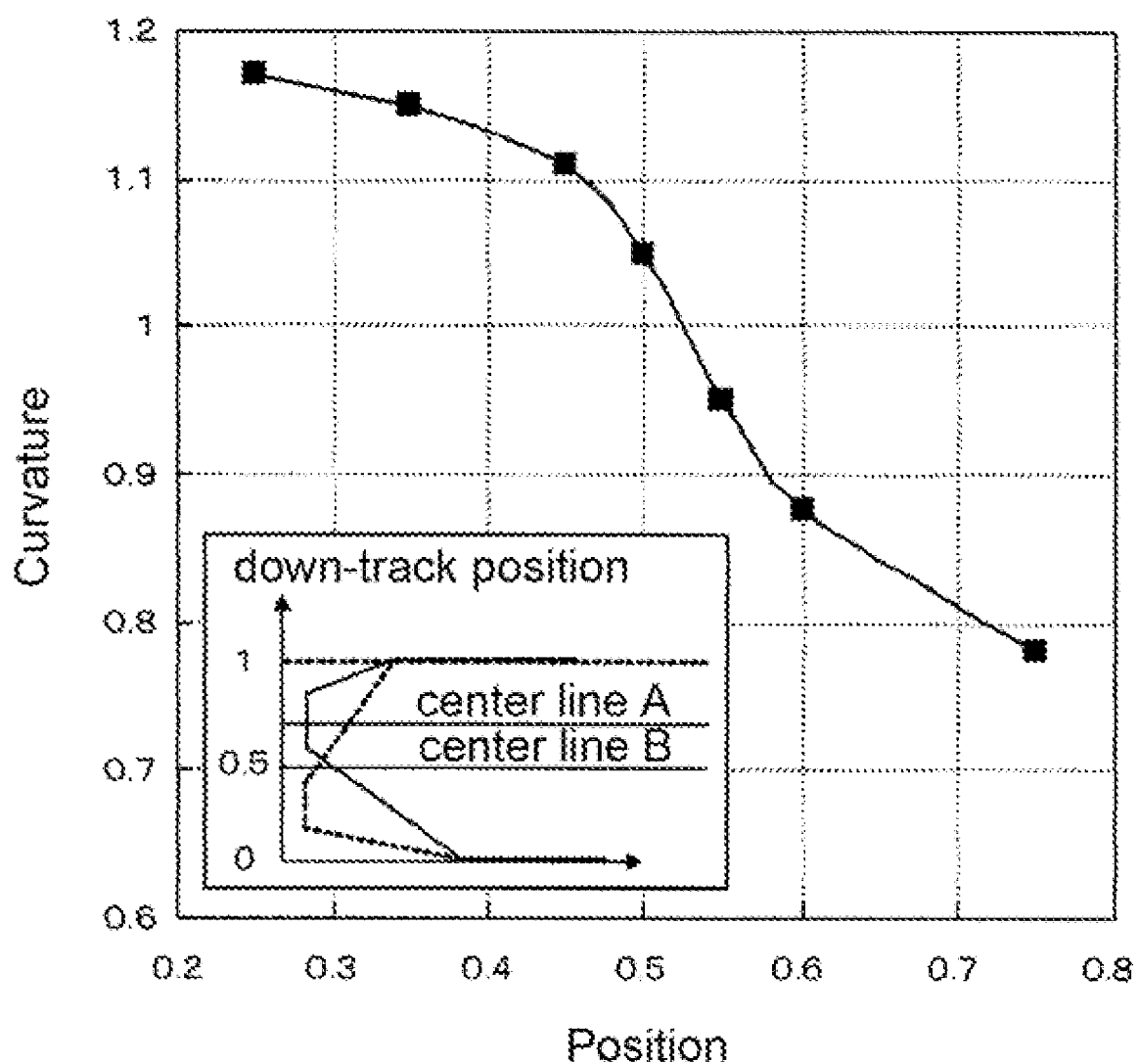
FIG. 4 shows the relative positional relationship between the center line A and center line B, and the relationship with the curvature of the head field, in the magnetic head in accordance with an exemplary embodiment.

In FIG. 4, the position in the down-track direction is expressed as the position in the down-track direction standardized to tMPB, taking the leading end of the main pole set-back portion as the origin. C decreases as the center position of the air bearing surface approaches the trailing side, and the effect is greater at 0.5 or above, in particular. This means that it is possible to effectively improve the linearity of the recording pattern in this region, according to one embodiment.

Reducing the thickness (tMPA) of the main pole air bearing surface is effective for reducing the transition line curvature while a strong magnetic field is generated, in one approach. However, if the thickness is simply reduced, there is a drop in field strength because of the reduction in the amount of magnetization exposed at the air bearing surface. A magnetic head, according to this exemplary embodiment, makes it possible to reduce the thickness at the tip end of the pole without reducing the field strength, and to improve the linearity of the transition line.

Figure 5A:
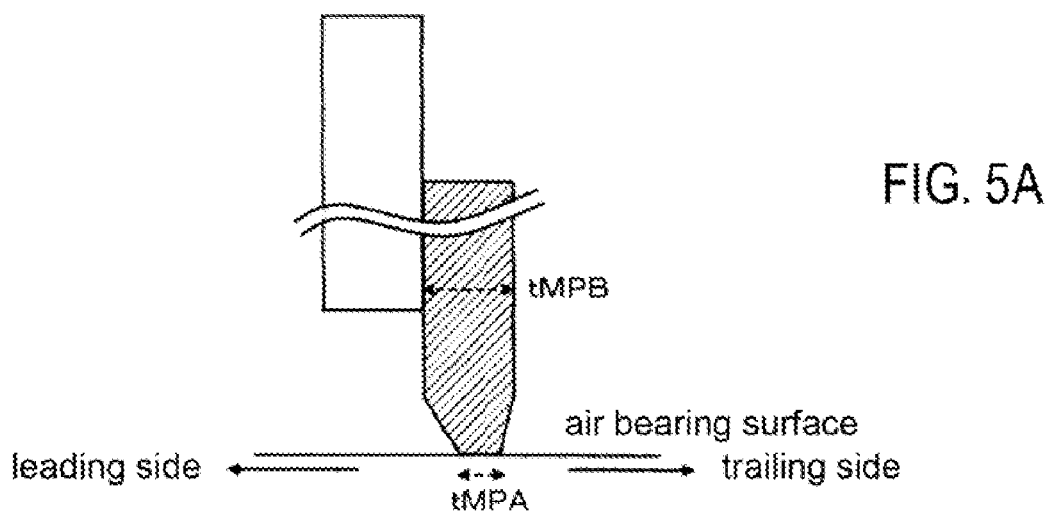
FIG. 5A shows a structure of the magnetic head, according to one embodiment.

FIG. 5A shows a structure of the magnetic head according to this exemplary embodiment. The thickness of the main pole increases moving away from the air bearing surface. In this case, the main pole air bearing surface portion is positioned further toward the trailing side than the main pole set-back portion, as described above.

Figure 5B:
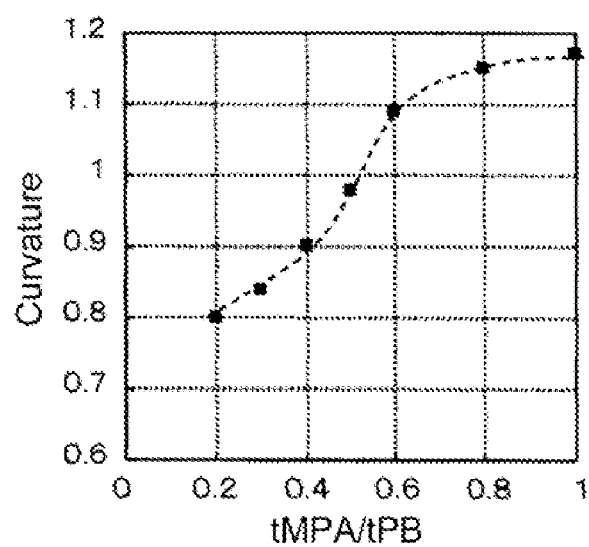
FIG. 5B shows the relationship between the ratio of the air bearing surface main pole thickness (tMPA) to set-back portion thickness (tMPB), and curvature of the transition line, according to one embodiment.

FIG. 5B shows the relationship between the ratio of tMPA to tMPB and the transition line curvature C, according to one embodiment. The main pole width in the head dimensions used in the calculations is 60 nm, and the main pole thickness is 120 nm. The curvature decreases as the thickness of the air bearing surface decreases, and the effect is especially pronounced at 0.5 or less, according to one approach.

Figure 5C:
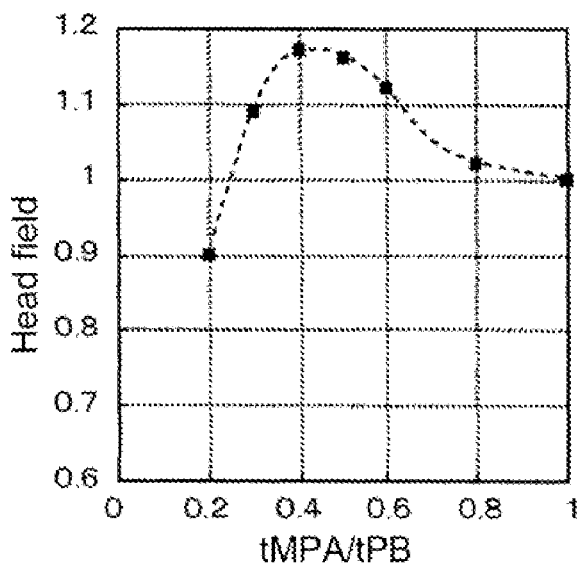
FIG. 5C shows the relationship with the field strength, in accordance with another exemplary embodiment.

According to this exemplary embodiment, the maximum field strength increases in a fixed or near fixed range together with a reduction in the thickness of the air bearing surface portion. FIG. 5C shows the relationship between the ratio of tMPA to tMPB obtained through simulation, and the field strength, in one approach. It should be noted that the calculation conditions are the same as for the curvature described above. Starting from tMPA=tMPB, the field strength increases together with a drop in tMPA. This is because the main pole shape of the magnetic head is such that the magnetic flux is concentrated toward the air bearing surface. In this way, the magnetic head, according to this exemplary embodiment, makes it possible to reduce the curvature of the transition line while a high magnetic field is produced. On the other hand, if tMPA/tMPB is about 0.2 or less, the field strength is smaller than with a conventional structure (tMPA/tMPB=1), according to one embodiment. The thickness of poles typically used is 100 nm-200 nm, and therefore the lower limit for tMPA is around 10 nm in general practice.

Figure 6A:
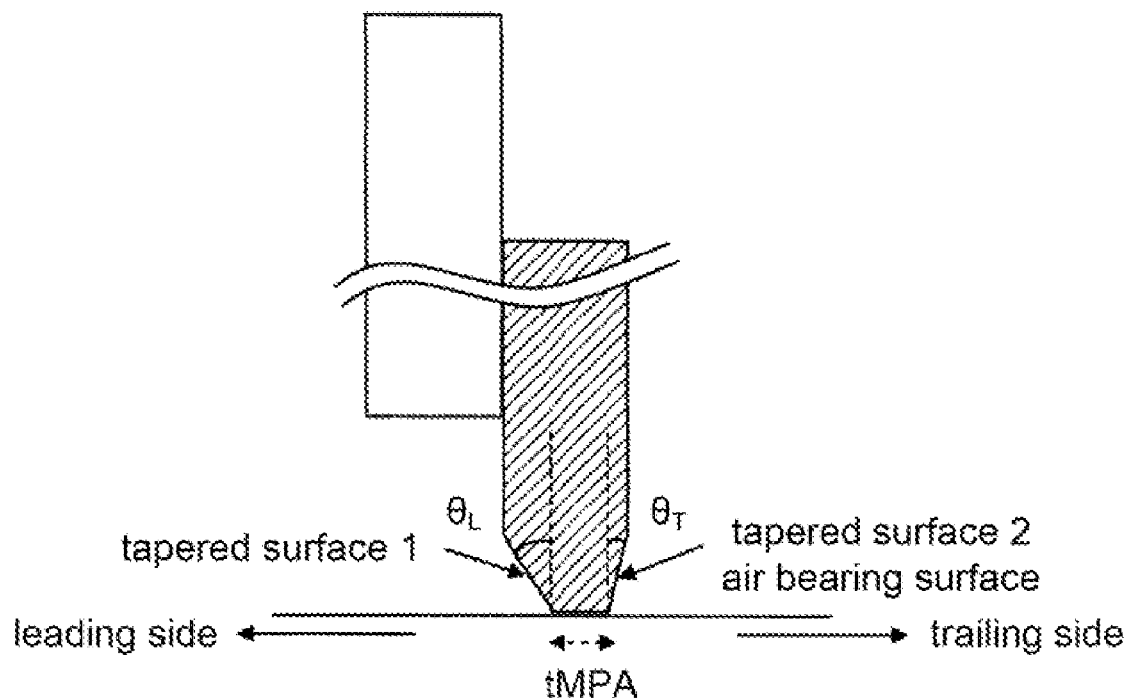
FIG. 6A shows a structure of the magnetic head, according to one embodiment.

As shown in FIG. 6A, a magnetic head according to another exemplary embodiment demonstrates a significant effect because the angle $\theta_L$ formed with the air bearing surface by the surface which is inclined in the down-track direction from the direction perpendicular to the air bearing surface lying on the main pole leading side (tapered surface 1) is smaller than the angle $\theta_T$ formed with the air bearing surface by the surface which is inclined in the down-track direction from the direction perpendicular to the air bearing surface lying on the main pole trailing side (tapered surface 2), in one embodiment.

Figure 6B:
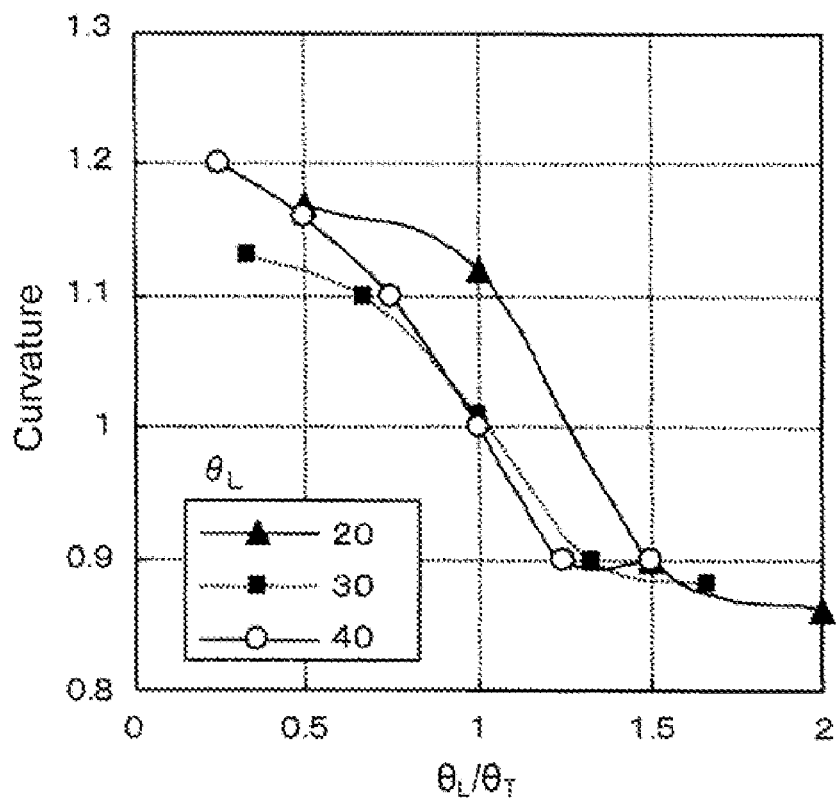
FIG. 6B shows the effects exerted on the head field curvature by the taper angle ($\theta_T$) on the trailing side and the taper angle ($\theta_L$) on the leading side of the magnetic head, in accordance with an exemplary embodiment.

FIG. 6B shows the relationship between $\theta_T/\theta_L$ and transition line curvature obtained by head field simulation, according to one embodiment. The main pole width in the head dimensions used in the calculations is about 60 nm, and the main pole thickness is about 120 nm. The curvature decreases as $\theta_T/\theta_L$ increases according to one approach. The reason for this is, presumably, that the amount of magnetic flux supplied by the tapered surface 1 and tapered surface 2 increases as the taper angle increases. This means that when $\theta_T/\theta T$ decreases, the magnetic flux on the main pole trailing side increases and the curvature is improved. As can be seen in the figures, this effect makes it possible to effectively reduce the curvature when $\theta_T < \theta_L$, according to one embodiment.

Figure 7A:
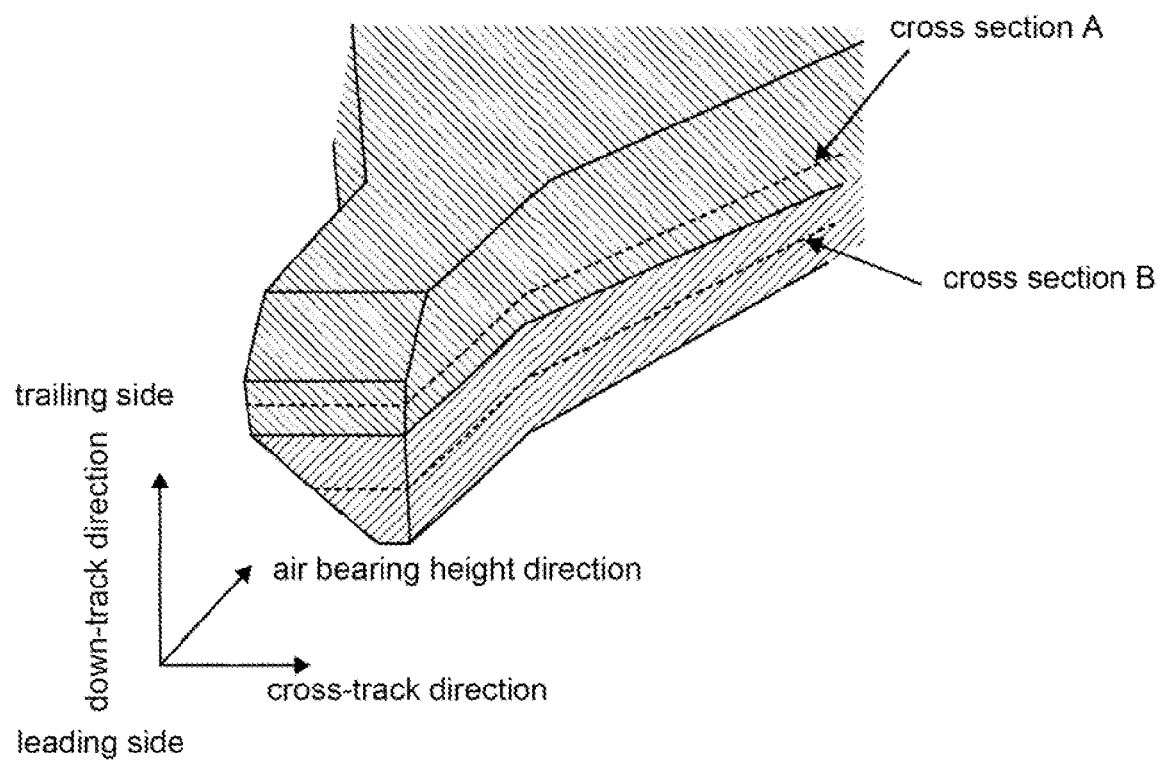
FIG. 7A shows a structure of the magnetic head, according to one embodiment.
Figure 7B:
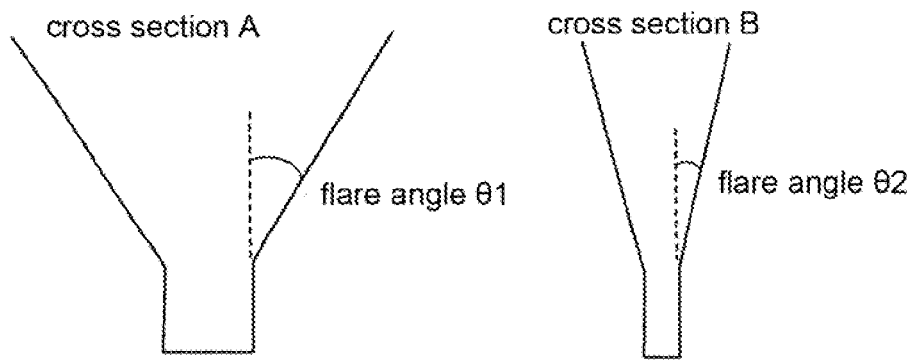
FIG. 7B shows the state of the flare angle, in accordance with an exemplary embodiment.

A magnetic head, according to this exemplary embodiment, may be even more effective because the flare angle of the portion lying on the trailing side from the air bearing surface portion is greater than the flare angle of the portion lying on the leading side from the air bearing surface. FIG. 7A shows the magnetic head, and FIG. 7B shows the cross sections A and B of the portion lying on the trailing side from the air bearing surface portion and the portion lying on the leading side from the air bearing surface, according to one embodiment. The effect is further improved in this case because the flare angles $\theta 1$ and $\theta 2$ in the cross sections A and B are set so that $\theta 1 < \theta 2$.

That is to say, the main pole has a flared shape in which the length in the track width direction increases moving away from the air bearing surface, and when the flare angle $\theta$ is defined as $\tan \theta = \Delta Tww/2h$ using the distance (h) in the direction perpendicular to the air bearing surface at any cross-track position, and the difference $\Delta Tww$ between the width in the track width direction at that position and the width of the air bearing surface portion, the flare angle $\theta 2$ of the portion present on the leading side from the air bearing surface is smaller than $\theta 1$ of the portion lying on the trailing side from the air bearing surface portion, in one approach.

The effect of narrowing the magnetic flux in the cross-track direction produced by the flared shape increases the greater the flare angle, up to around 50°. This means that it is possible to selectively concentrate magnetic flux on the trailing portion by making the flare angle of the main pole portion lying on the trailing side greater than on the leading side, in one approach.

The magnetic head, according to one exemplary embodiment, demonstrates an even more significant effect because the thickness in the down-track direction of the main pole at the air bearing surface is less than the pole width, e.g., the length in the cross-track direction.

Figure 8A:
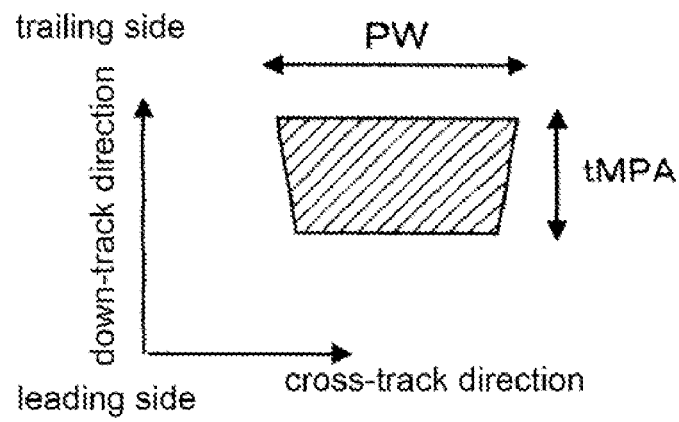
FIG. 8A shows a structure of the magnetic head, according to one embodiment.

FIG. 8A shows a schematic of the air bearing surface portion according to a preferred mode. Here, the thickness in the down-track direction of the main pole air bearing surface portion is referred to as tMPA, and the pole width is referred to as PW.

Figure 8B:
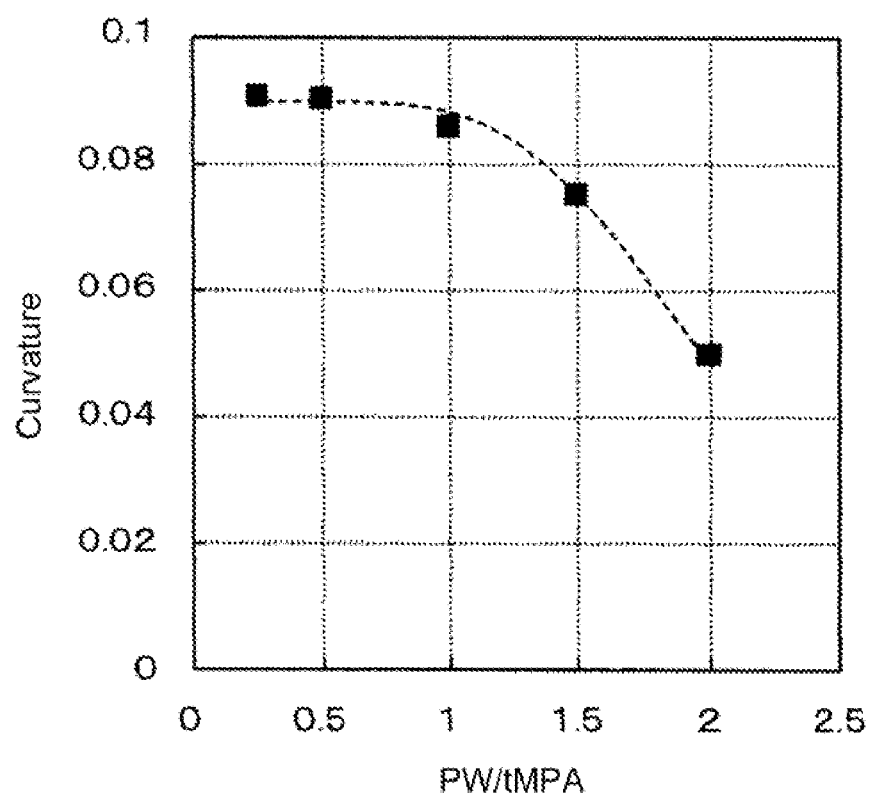
FIG. 8B shows the effects exerted on the head field curvature by the track width (PW) and thickness (tMPA) of the main pole at the air bearing surface of the magnetic head, in accordance with an exemplary embodiment.

FIG. 8B shows the relationship between curvature and PW/tMPA, obtained by head field simulation. Here, PW is about 60 nm and the main pole thickness is varied between about 30 and 240 nm. As can be seen from the figure, the transition line curvature decreases as PW/tMPA decreases. This makes it possible to improve the linearity of the recording transition line. Furthermore, the effect is even greater when PW/tMPA>1, according to one approach.

Figure 9A:
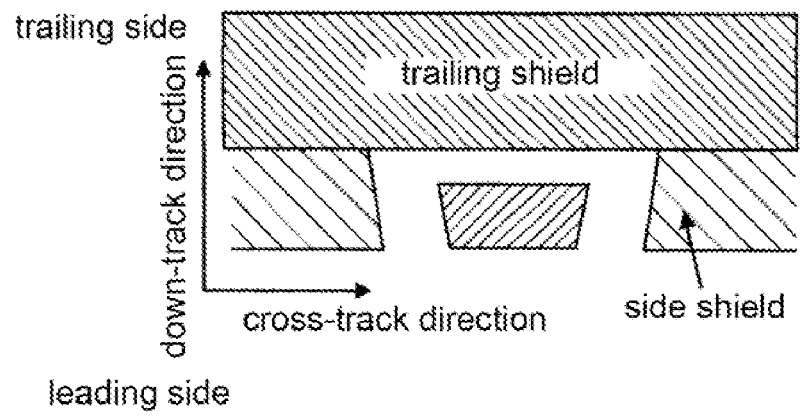
FIGS. 9A-9B show the relationship between the saturation magnetic flux density of the shield and the head field curvature in accordance with an exemplary embodiment.

FIG. 9A shows a shield configuration of the magnetic head according to one exemplary embodiment. The magnetic head according to this example has a trailing shield positioned on the main pole trailing side, and side shields positioned on both sides in the main pole cross-track direction. A feature of this example is that the saturation magnetic flux density of the trailing shield is greater than the saturation magnetic flux density of the side shields. Here, a magnetic material having high saturation magnetization (1.6-2.4 T), such as CoFe or CoFeNi, may be used for the trailing shield, a magnetic material having relatively low saturation magnetization (1.0-1.5 T), such as $Ni_{80}Fe_{20}$ or $Ni_{45}Fe_{55}$, may be used for the side shields, according to some embodiments.

Figure 9B:
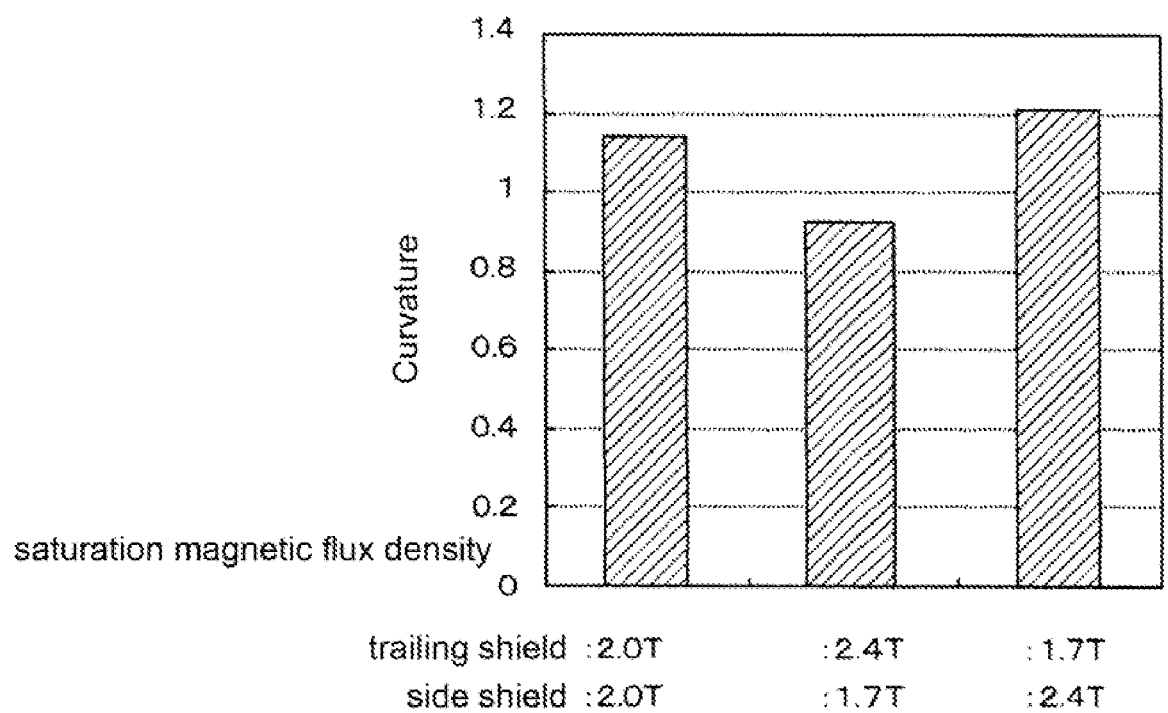

FIG. 9B shows the relationship between the saturation magnetic flux density distribution of the shield and curvature, obtained by magnetic field simulation. The curvature is at a minimum when the saturation magnetic flux density of the trailing shield portion is greater than that of the side shield portion. This effect is effectively demonstrated in combination with the magnetic head structures according to several exemplary embodiments. The reason for this is, presumably, that an even higher magnetic flux density shield effect is demonstrated by concentrating the magnetic flux produced by the pole on the trailing side.

Figure 10A:
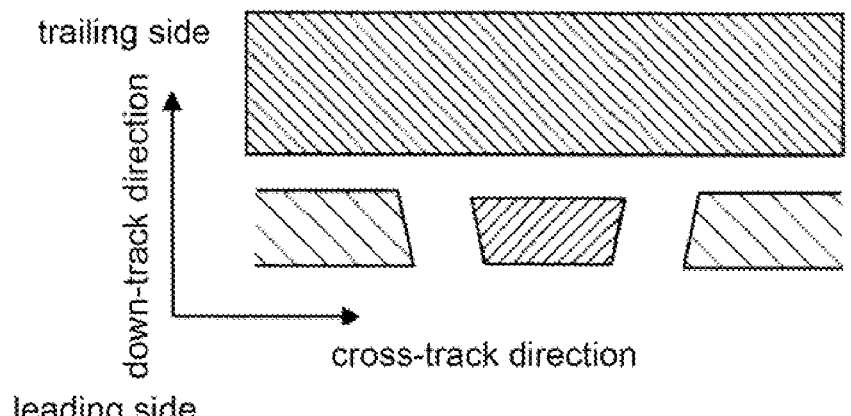
FIGS. 10A-10C are schematics showing a preferred mode of the shields in accordance with an exemplary embodiment.
Figure 10B:
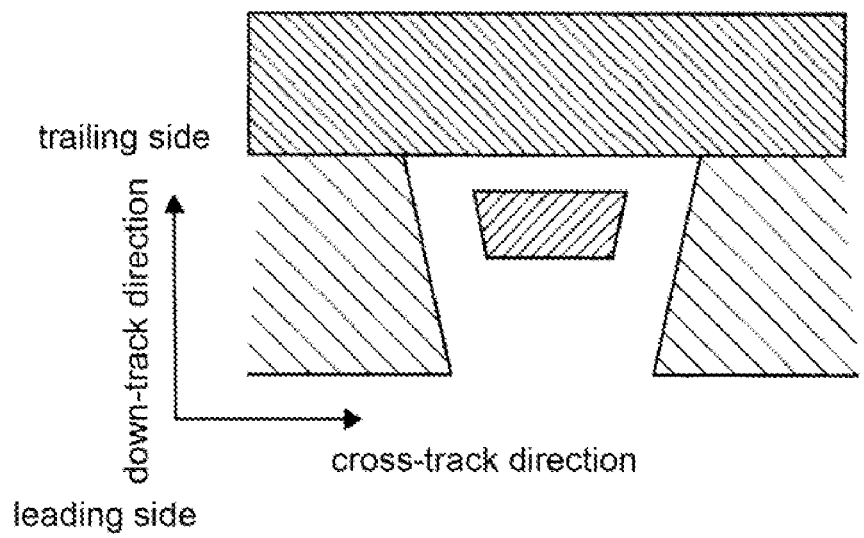
Figure 10C:
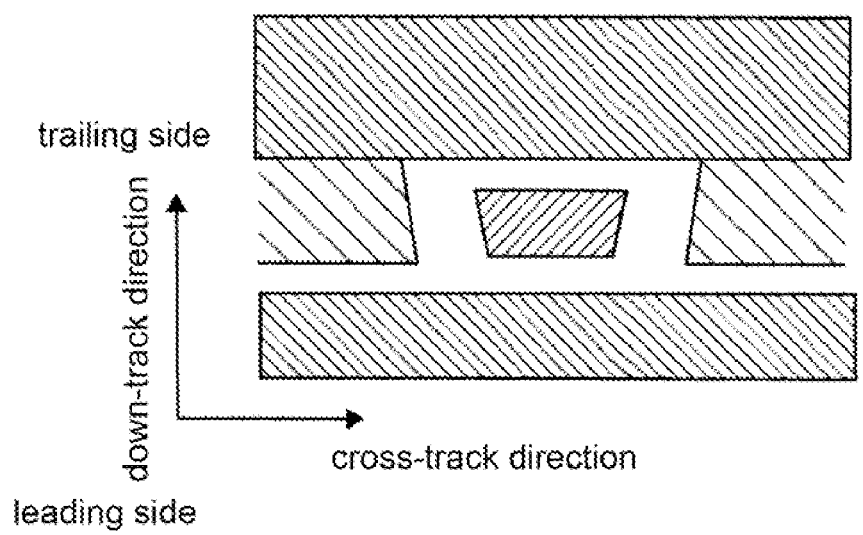

FIGS. 10A-10C shows several variant examples of an exemplary embodiment. The high magnetic flux density shield effect is effective even if the trailing shield and side shields are not magnetically connected, for example FIG. 10A. In this example, when the side shields and trailing shield are formed in the production process, it is possible to carry out a planarization treatment, etc., which is effective for increasing the shape control precision, in some approaches. Furthermore, a configuration in which the side shields are disposed up to the leading side from the main pole, as shown in FIG. 10B, or a configuration in which the shield is applied to the leading side, as shown in FIG. 10C is also feasible. These configurations make it possible to further reduce leakage of magnetic flux from the tapered portion on the leading side, and it is possible to envision a further curvature reducing effect and adjacent track erase control.

A method for producing a magnetic head according to this exemplary embodiment is described with reference to FIGS. 11A-11I.

Each figure shows a cross-sectional view of the track center part, according to various embodiments.

Figure 11A:
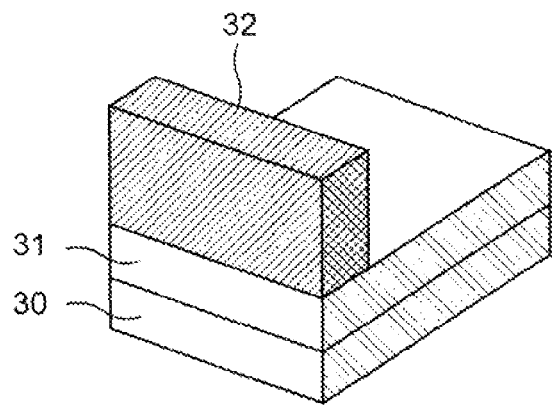
FIGS. 11A-11I show a process for producing a magnetic head in accordance with an exemplary embodiment.
Figure 11B:
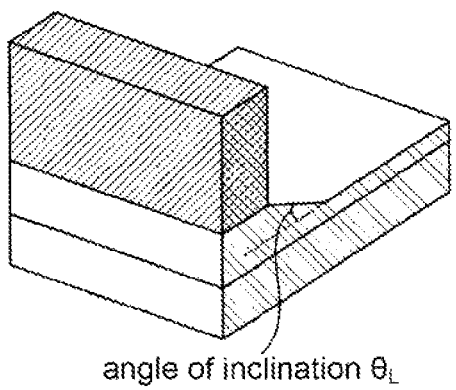

First, a mask 32 comprising a photoresist or the like is formed on an inorganic insulating film 31 formed on a wafer 30, as shown in FIG. 11A. In this case, it is possible to use alumina, $SiO_2$, NiCr, etc., for the inorganic insulating film. Next, the inorganic insulating film is etched using the mask 32 to form an inclined surface, as shown in FIG. 11B. The etching may be carried out using Ar ion milling, RIE employing a chlorine-based gas, reactive ion milling employing a fluorine-based gas mixture such as $Ar+CHF_3$, etc. In this process, the angle of the inclined surface is controlled by the etching angle and mask thickness. Furthermore, it is possible to produce the shape described in relation to an exemplary embodiment by making the etching depth at least half of the overall film thickness.

Figure 11C:
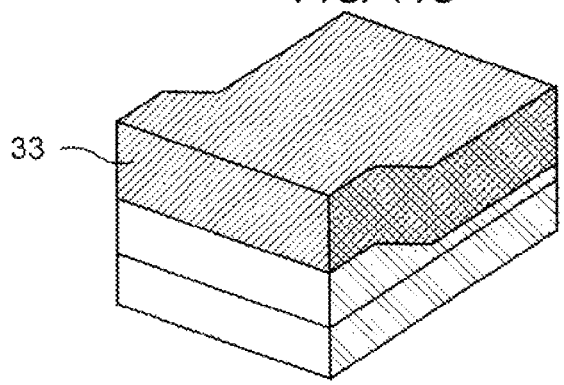
Figure 11D:
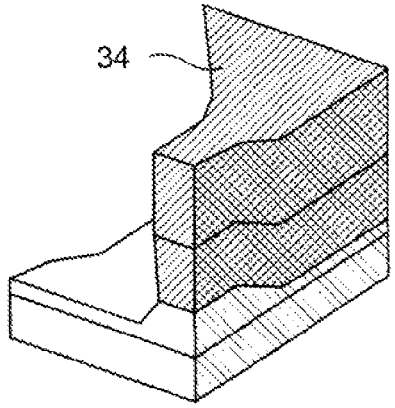
Figure 11E:
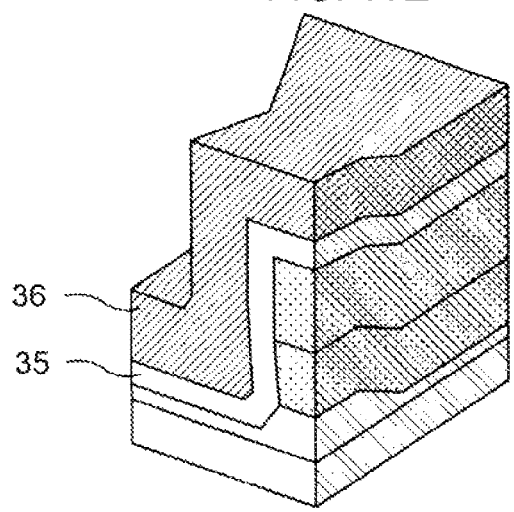

Next, the mask 32 is removed, after which a main pole magnetic film 33 constituting the pole is formed by sputtering or some other technique, as shown in FIG. 11C. Furthermore, after the mask has been removed, an electrode film such as Ta may be formed by sputtering, after which a magnetic film may be formed by a plating technique or some other technique. In addition, a photomask 34 in the shape of the main pole is formed thereon, and etching is carried out by Ar ion milling or some other technique, as shown in FIG. 11D. A non-magnetic side gap film 35 having a prescribed thickness is formed next. In addition, a side shield magnetic film 36 made of magnetic elements such as Co, Fe, Ni, etc., which comprise the side shields, is formed, as shown in FIG. 11E.

Figure 11F:
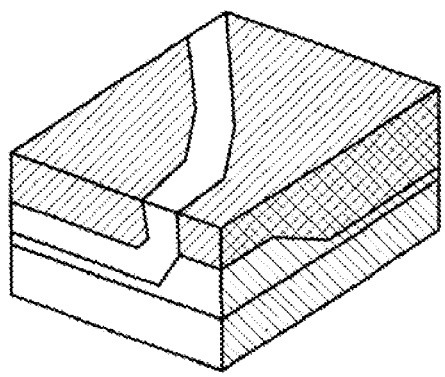
Figure 11G:
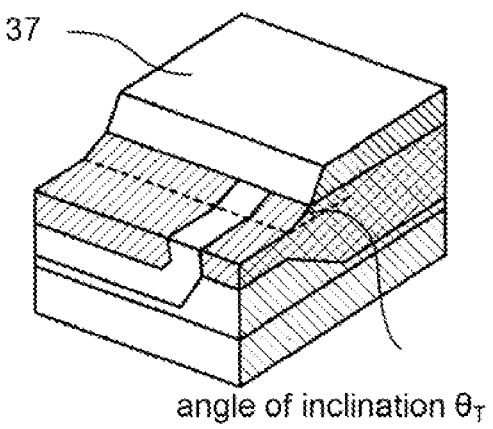

After this, chemical mechanical polishing (CMP) or the like is used to planarize the surface, as shown in FIG. 11F. Following this, the tapered portion on the trailing side is formed using a mask 37 which is formed at a position set back from the air bearing surface, as shown in FIG. 11G. In this process, the angle of the inclined surface is controlled by the etching angle and the mask thickness. By making the angle of this inclined surface more gentle than the abovementioned taper angle on the leading side, it is possible to produce a shape such as that in an exemplary embodiment described previously. Furthermore, by controlling the etching depth during the process, it is possible to produce a shape such as that in an earlier exemplary embodiment. In this case, it is possible to use a photoresist or a hard mask ($SiO_2$, DLC (diamond-like carbon)) transferred by RIE, or the like, for the mask 37, according to some approaches.

Figure 11H:
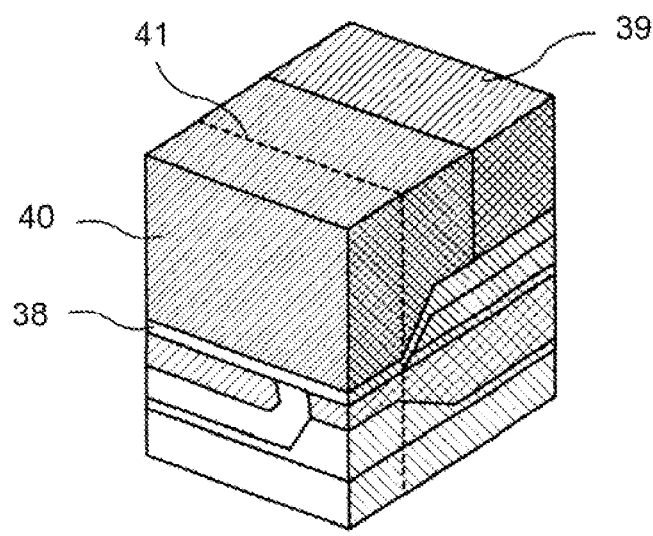
Figure 11I:
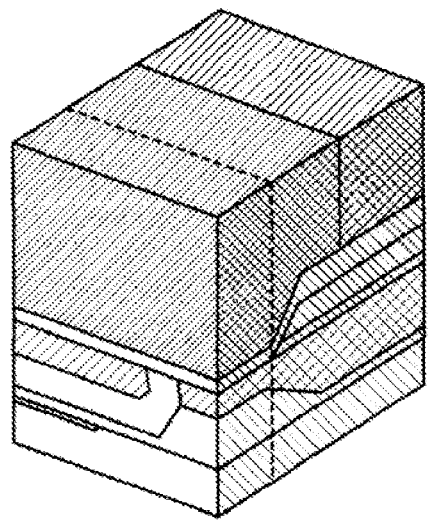

Next, a non-magnetic film 38 having a prescribed thickness and comprising alumina, Ta, NiCr, etc., is formed. A photomask 39 constituting a plating frame is then formed, after which an electrode film comprising Ru, Ta, etc., is formed, and a magnetic Film 40 comprising magnetic elements such as Co, Fe, Ni, etc., that comprise the trailing shield is formed thereon, as shown in FIG. 11H. In this process, the compositions of the magnetic films constituting the trailing shield and side shields are selected for use. For example, a magnetic material having high saturation magnetization (1.6-2.4 T), such as CoFe, CoFeNi, etc., may be used for the trailing shield, and a magnetic material having relatively low saturation magnetization (1.0-1.5 T), such as $Ni_{80}Fe_{20}$, $Ni_{45}Fe_{55}$, etc., may be used for the side shields. Finally, lapping is carried out so that the position shown by the broken line 41 in FIG. 11H comprises the air bearing surface, as shown in FIG. 11I.

According to another embodiment, a perpendicular magnetic recording head in which a transition line having a correct linearity is formed while a high field strength is produced, and in which deterioration in the recording information of adjacent tracks due to skewing can be suppressed. Additionally, a method for producing this perpendicular magnetic recording head is also provided.

A perpendicular magnetic recording head according to one embodiment may preferably be a perpendicular magnetic recording head, wherein a thickness in a down-track direction of a main pole increases moving away from an air bearing surface, and a center position in a thickness direction of a portion of the main pole which is exposed at the air bearing surface (the air bearing surface portion) may be positioned on a trailing side with respect to the center position in the thickness direction of the portion of greatest thickness in a portion which is set back from the air bearing surface (the set-back portion).

According to a further preferred embodiment, the thickness in the down-track direction of the air bearing surface portion may be no more than half the thickness of the set-back portion.

Furthermore, in one embodiment, the perpendicular magnetic recording head may have a surface inclined in the down-track direction from the direction perpendicular to the air bearing surface on the trailing side and leading side of the main pole, and the angle of inclination is greater on the trailing side than on the leading side.

Furthermore, in one embodiment, the main pole may have a flared shape in which the length in the track width direction increases moving away from the air bearing surface, and when the flare angle θ is defined as tan θ=ΔTww/2 h using the distance h in the direction perpendicular to the air bearing surface at any cross-track position, and the difference ΔTww between the width in the track width direction at that position and the width of the air bearing surface portion, the flare angle θ2 of the portion present on the leading side from the air bearing surface is smaller than θ1 of the portion lying on the trailing side from the air bearing surface portion.

Furthermore, in one embodiment, the width in the down-track direction of the air bearing surface portion may be greater than the width in the cross-track direction of the air bearing surface portion.

Furthermore, in one embodiment, the width in the down-track direction of the air bearing surface portion may be no more than half the width in the cross-track direction of the air bearing surface portion.

Also, in one embodiment, the perpendicular magnetic recording head has a trailing shield disposed on the trailing side of the main pole, and side shields disposed on both sides in the cross-track direction of the main pole, and the saturation magnetic flux density of the trailing shield is greater than the saturation magnetic flux density of the side shields.

In another embodiment, a system includes a magnetic recording medium, at least one magnetic recording head as described in any of the previous embodiments for reading from and/or writing to the magnetic recording medium, a magnetic head slider for supporting the at least one magnetic recording head, and a control unit coupled to the at least one magnetic recording head for controlling operation of the at least one magnetic recording head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording head, comprising a main pole,
    wherein a thickness in a down-track direction of the main pole increases moving away from an air bearing surface of the magnetic pole, and
    wherein a center position in a thickness direction of a portion of the main pole which is exposed at the air bearing surface (the ABS portion) is positioned toward a trailing side of the main pole with respect to a center position in a thickness direction of a portion of the magnetic pole having a greatest cross-sectional area and which is set back from the air bearing surface (the set-back portion),
    wherein the main pole has a flared shape in which a length in a track-width direction increases moving away from the air bearing surface,
    wherein a flare angle θ is defined as tanθ=ΔTww/2h, where h is a distance in a direction perpendicular to the air bearing surface at any first cross-track position and ΔTww is a difference between a width in the track-width direction at the first position and a width of the ABS portion, and
    wherein a flare angle θ2 of a portion of the main pole present on the leading side from the air bearing surface is smaller than a flare angle θ1 of a portion of the main pole lying on the trailing side from the ABS portion.

2. The perpendicular magnetic recording head as recited in claim 1, further comprising a surface inclined in the down-track direction from a direction perpendicular to the air bearing surface on a trailing side and a leading side of the main pole, wherein an angle of inclination is greater on the trailing side than on the leading side of the main pole.

3. The perpendicular magnetic recording head as recited in claim 2, wherein a width in the down-track direction of the ABS portion is greater than a width in the cross-track direction of the ABS portion.

4. The perpendicular magnetic recording head as recited in claim 2, wherein a width in the down-track direction of the ABS portion is 50% or less of a width in the cross-track direction of the ABS portion.

5. The perpendicular magnetic recording head as recited in claim 1, wherein a width in the down-track direction of the ABS portion is 50% or less of a width in the cross-track direction of the ABS portion.

6. The perpendicular magnetic recording head as recited in claim 2, further comprising:
    a trailing shield disposed on the trailing side of the main pole; and
    side shields disposed on both sides in a cross-track direction of the main pole,
    wherein a saturation magnetic flux density of the trailing shield is greater than a saturation magnetic flux density of the side shields.

7. The perpendicular magnetic recording head as recited in claim 6, wherein a width in the down-track direction of the ABS portion is greater than a width in the cross-track direction of the ABS portion.

8. The perpendicular magnetic recording head as recited in claim 1, wherein a width in the down-track direction of the ABS portion is greater than a width in the cross-track direction of the ABS portion.

9. A perpendicular magnetic recording head, comprising:
    a main pole, wherein a thickness in a. down-track direction of the main pole increases moving away from an air bearing surface of the magnetic pole, wherein a center position in a thickness direction of a portion of the main pole which is exposed at the air bearing surface (the ABS portion) is positioned toward a trailing side of the main pole with respect to a center position in a thickness direction of a portion of the magnetic pole having a greatest cross-sectional area and which is set back the air bearing surface (the setback portion), wherein a thickness in the down-track direction of the ABS portion is no more than half a thickness of the set-back portion in the down-track direction.

10. The perpendicular magnetic recording head as recited in claim 9, wherein a width in the down-track direction of the ABS portion is greater than a width in the cross-track direction of the ABS portion.

11. The perpendicular magnetic recording head as recited in claim 9, wherein the main pole has a flared shape in which a length in a track-width direction increases moving away from the air bearing surface, wherein a flare angle θ is defined as tan θ=ΔTww/2 h, where h is a distance in a direction perpendicular to the air bearing surface at any first cross-track position and ΔTww is a difference between a width in the track-width direction at the first position and a width of the ABS portion, and wherein a flare angle θ2 of a portion of the main pole present on the leading side from the air bearing surface is smaller than a flare angle θ1 of a portion of the main pole lying on the trailing side from the ABS portion.

12. The perpendicular magnetic recording head as recited in claim 11, wherein a width in the down-track direction of the ABS portion is greater than a width in the cross-track direction of the ABS portion.

13. The perpendicular magnetic recording head as recited in claim 9, further comprising a surface inclined in the down-track direction from a direction perpendicular to the air bearing surface on a trailing side and a leading side of the main pole, wherein an angle of inclination is greater on the trailing side than on the leading side of the main pole.

14. The perpendicular magnetic recording head as recited in claim 13, wherein the main pole has a flared shape in which a length in a track-width direction increases moving away from the air bearing surface, wherein a flare angle θ is defined as tan θ=ΔTww/2 h, where h is a distance in the direction perpendicular to the air bearing surface at any first cross-track position and ΔTww is a difference between a width in the track-width direction at the first position and a width of the ABS portion, and wherein a flare angle θ2 of a portion of the main pole present on the leading side from the air bearing surface is smaller than a flare angle θ1 of a portion of the main pole lying on the trailing side from the ABS portion.

15. The perpendicular magnetic recording head as recited in claim 14, wherein a width in the down-track direction of the ABS portion is greater than a width in the cross-track direction of the ABS portion.

16. The perpendicular magnetic recording head as recited in claim 13, wherein a width in the down-track direction of the ABS portion is greater than a width in the cross-track direction of the ABS portion.

17. The perpendicular magnetic recording head as recited in claim 13, wherein a width in the down-track direction of the ABS portion is 50% or less of a width in the cross-track direction of the ABS portion.

18. The perpendicular magnetic recording head as recited in claim 17, further comprising:

a trailing shield disposed on the trailing side of the main pole; and side shields disposed on both sides in a cross-track direction of the main pole, wherein a saturation magnetic flux density of the trailing shield is greater than a saturation magnetic flux density of the side shields.

19. A perpendicular magnetic recording head, comprising:

a main pole;

a trailing shield disposed on the trailing side of the main pole; and side shields disposed on both sides in a cross-track direction of the main pole, wherein a thickness in a down-track direction of the main pole increases moving away from an air bearing surface of the magnetic pole, wherein a center position in a thickness direction of a portion of the main pole which is exposed at the air bearing surface (the ABS portion) is positioned toward a trailing side of the main pole with respect to a center position in a thickness direction of a portion of the magnetic pole having a greatest cross-sectional area and which is set back from the air bearing surface (the setback portion), and wherein a saturation magnetic flux density of the trailing shield is greater than a saturation magnetic flux density of the side shields.

20. A perpendicular magnetic recording head, comprising a main pole, wherein a thickness in a down-track direction of the main pole increases moving away from an air bearing surface of the magnetic pole, wherein a center position in a thickness direction of a portion of the main pole which is exposed at the air bearing surface (the ABS portion) is positioned toward a trailing side of the main pole with respect to a center position in a thickness direction of a portion of the magnetic pole having a greatest cross-sectional area and which is set back from the air bearing surface (the setback portion), and wherein a width in the down-track direction of the ABS portion is 50% or less of a width in the cross-track direction of the ABS portion.

21. The perpendicular magnetic recording head as recited in claim 20, further comprising:

a trailing shield disposed on the trailing side of the main pole; and side shields disposed on both sides in a cross-track direction of the main pole, wherein a saturation magnetic flux density of the trailing shield is greater than a saturation magnetic flux density of the side shields.

22. A system, comprising:

a magnetic recording medium;

at least one magnetic recording head as described in claim 1 for reading from and/or writing to the magnetic recording medium;

a magnetic head slider for supporting the at least one magnetic recording head; and a control unit coupled to the at least one magnetic recording head for controlling operation of the at least one magnetic recording head.

23. A method for producing a perpendicular magnetic recording head, comprising:

forming a mask on an inorganic insulating film formed on a wafer;

etching the inorganic insulating film using the mask to form an inclined surface, wherein an angle of the inclined surface is controlled by the etching angle and the mask thickness so that an etching depth is at least half of an overall film thickness;

removing the mask;

forming a main pole magnetic film comprising a main pole by sputtering;

forming a photomask in a shape of the main pole on the main pole magnetic film;

etching the main pole magnetic film to form the main pole;

planarizing the main pole magnetic film;

forming a tapered portion of the main pole on a trailing side of the main pole using a mask which is formed at a position set back from an air bearing surface of the main pole, wherein an angle of the inclined surface is controlled by an etching angle and a thickness of the mask; and lapping to form the air bearing surface of the main pole, wherein a thickness in a down-track direction of the main pole increases moving away from an air bearing surface of the magnetic pole, and wherein a center position in a thickness direction of a portion of the main pole which is exposed at the air bearing surface (the ABS portion) is positioned toward a trailing side of the main pole with respect to a center position in a thickness direction of a portion of the magnetic pole having a greatest cross-sectional area and which is set back from the air bearing surface (the setback portion), wherein the main pole has a flared shape in which a length in a track-width direction increases moving away from the air bearing surface, wherein a flare angle $\theta$ is defined as $\tan \theta = \Delta Tww/2h$, where h is a distance in a direction perpendicular to the air bearing surface at any first cross-track position and $\Delta Tww$ is a difference between a width in the track-width direction at the first position and a width of the ABS portion, and wherein a flare angle $\theta 2$ of a portion of the main pole present on the leading side from the air bearing surface is smaller than a flare angle $\theta 1$ of a portion of the main pole lying on the trailing side from the ABS portion.

* * * * *